Jan. 18, 1949.　　　F. E. COLE ET AL　　　2,459,308
FUSE SETTING AND RAMMING MECHANISM
Filed Oct. 30, 1945　　　　　　　　　　　12 Sheets-Sheet 1

Inventors
Frank E. Cole
William V. Goodhue
Roland Heeley
By their Attorney

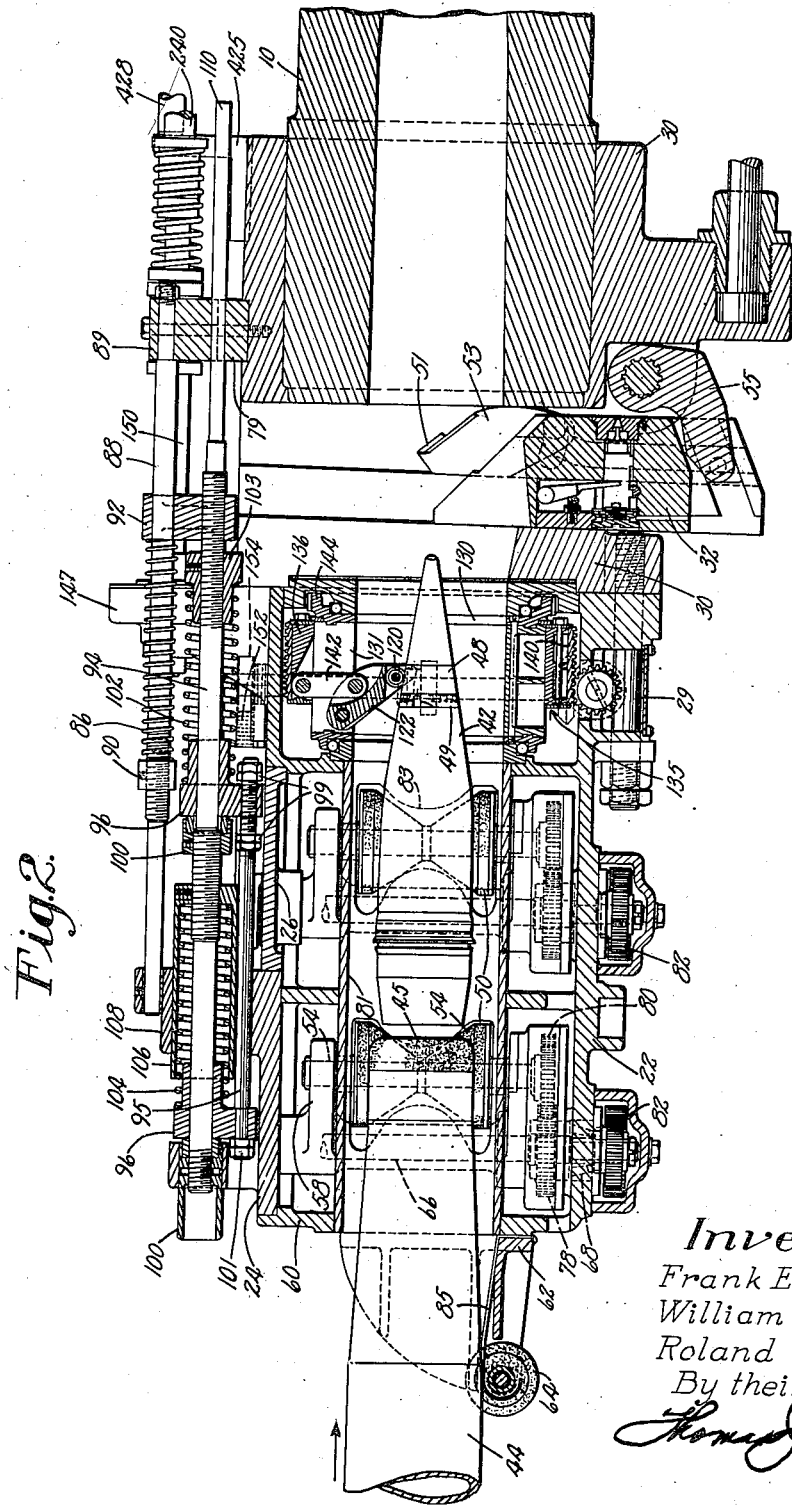

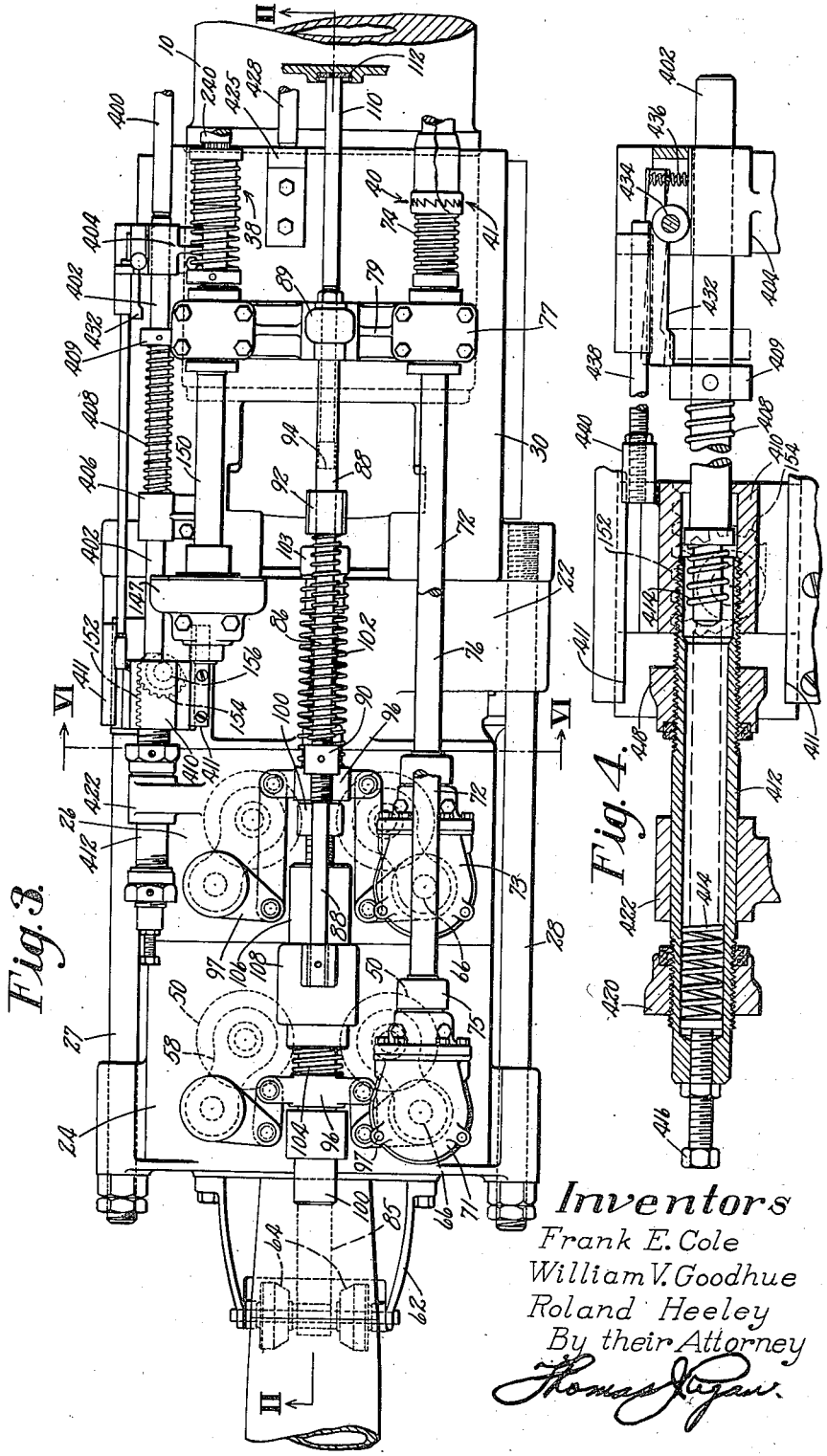

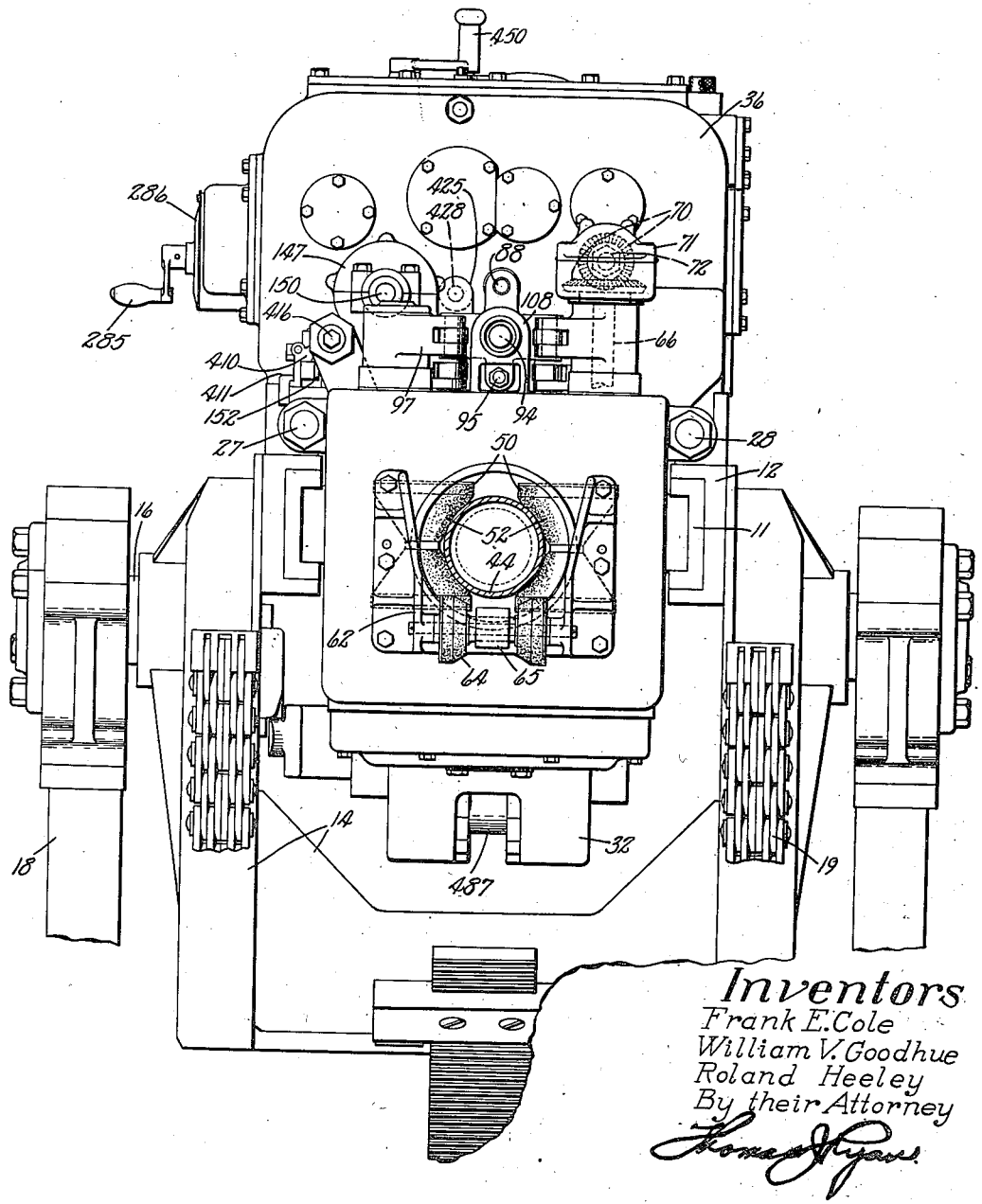

Jan. 18, 1949.   F. E. COLE ET AL   2,459,308
FUSE SETTING AND RAMMING MECHANISM
Filed Oct. 30, 1945   12 Sheets-Sheet 5
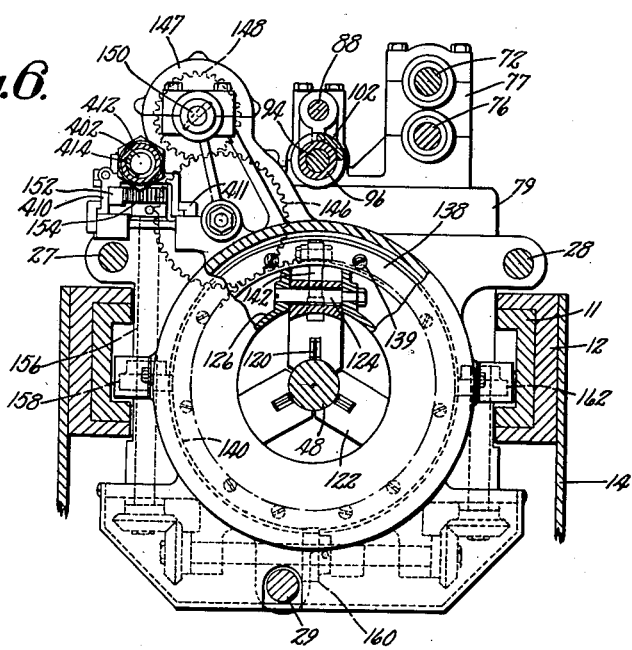
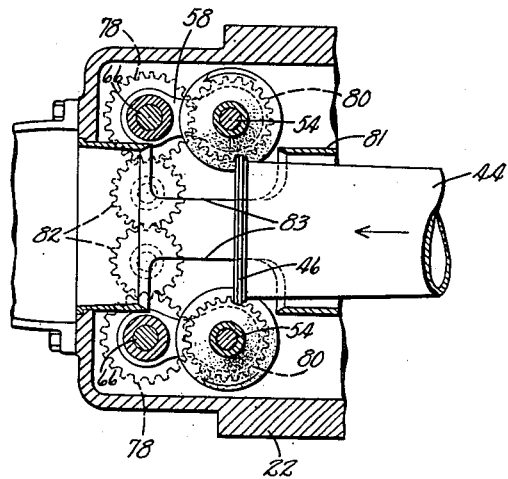
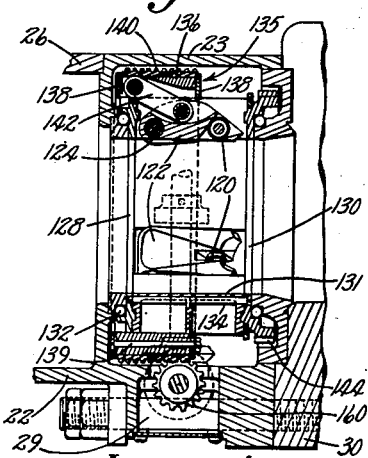
Inventors
Frank E. Cole
William V. Goodhue
Roland Heeley
By their Attorney Inventors
Frank E. Cole
William V. Goodhue
Roland Heeley
By their Attorney Jan. 18, 1949. F. E. COLE ET AL 2,459,308
FUSE SETTING AND RAMMING MECHANISM
Filed Oct. 30, 1945 12 Sheets-Sheet 8

Inventors
Frank E. Cole
William V. Goodhue
Roland Heeley
By their Attorney

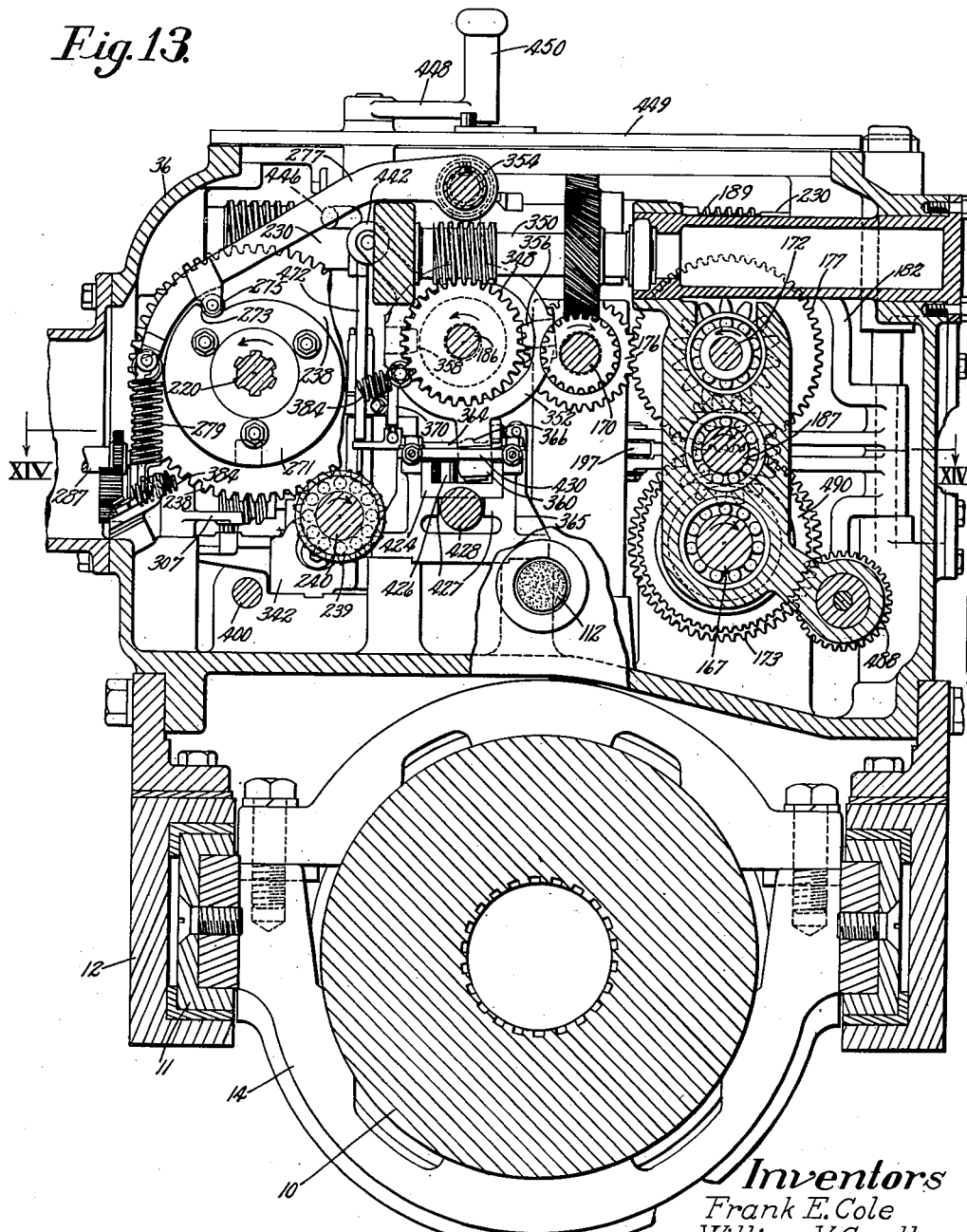

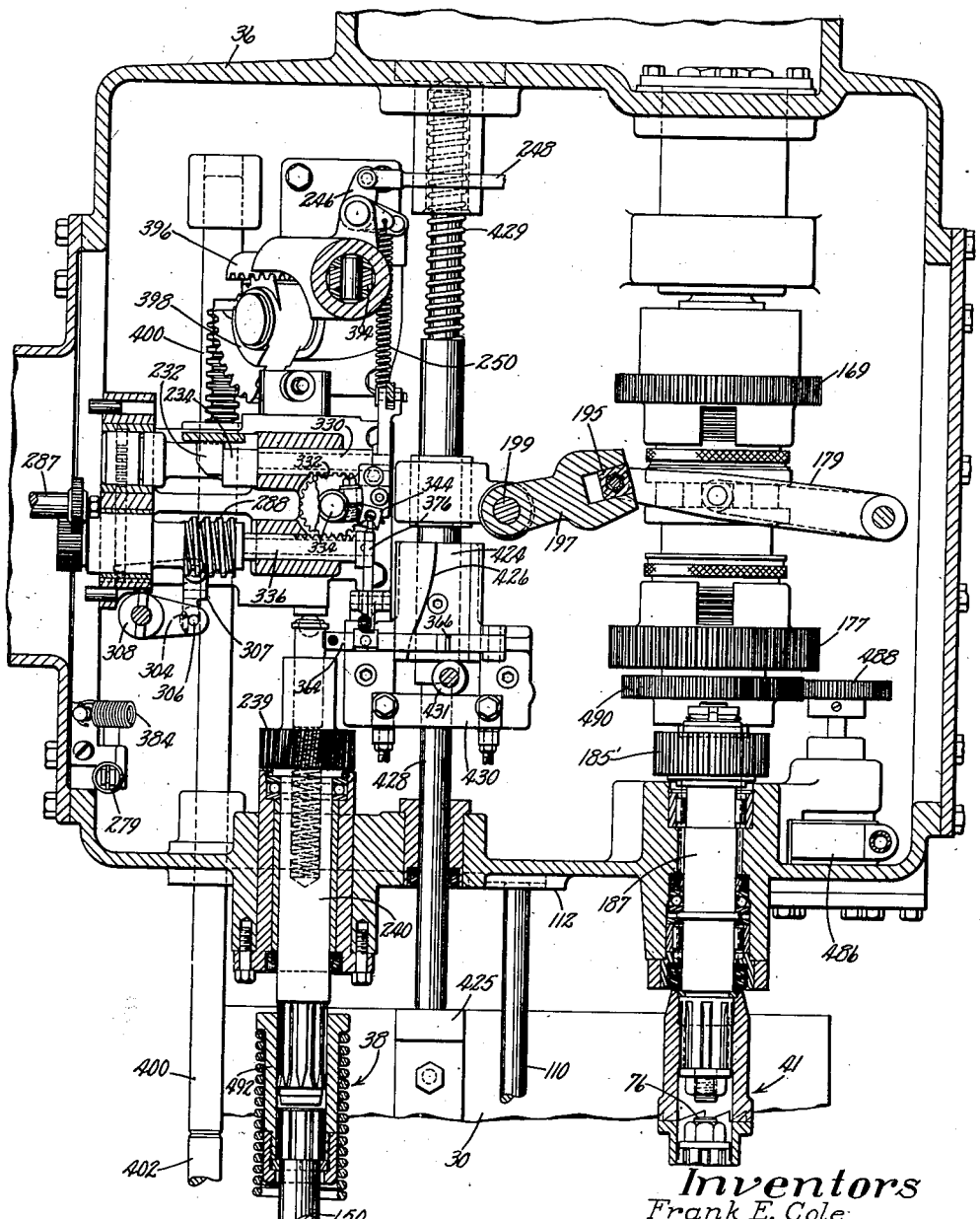

Jan. 18, 1949.                F. E. COLE ET AL                2,459,308
                        FUSE SETTING AND RAMMING MECHANISM
Filed Oct. 30, 1945                                    12 Sheets-Sheet 11
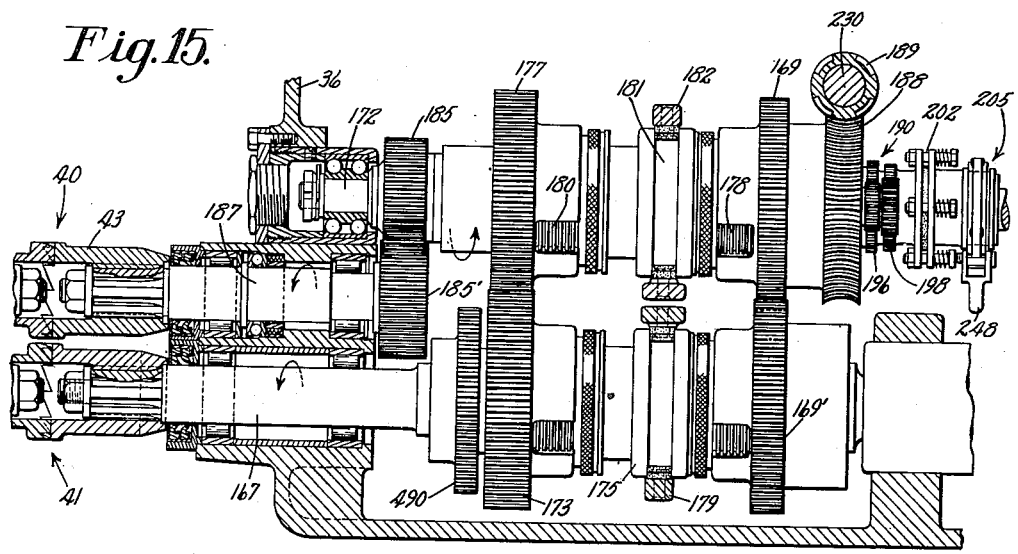
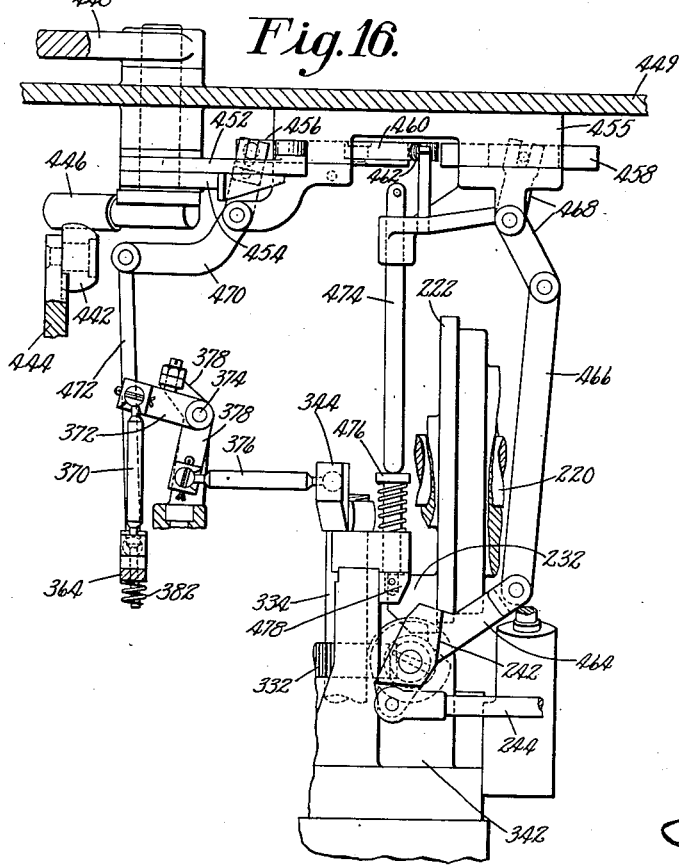
Inventors
Frank E. Cole
William V. Goodhue
Roland Heeley
By their Attorney Jan. 18, 1949.　　　　F. E. COLE ET AL　　　　2,459,308
FUSE SETTING AND RAMMING MECHANISM
Filed Oct. 30, 1945　　　　　　　　　　　　　　12 Sheets-Sheet 12
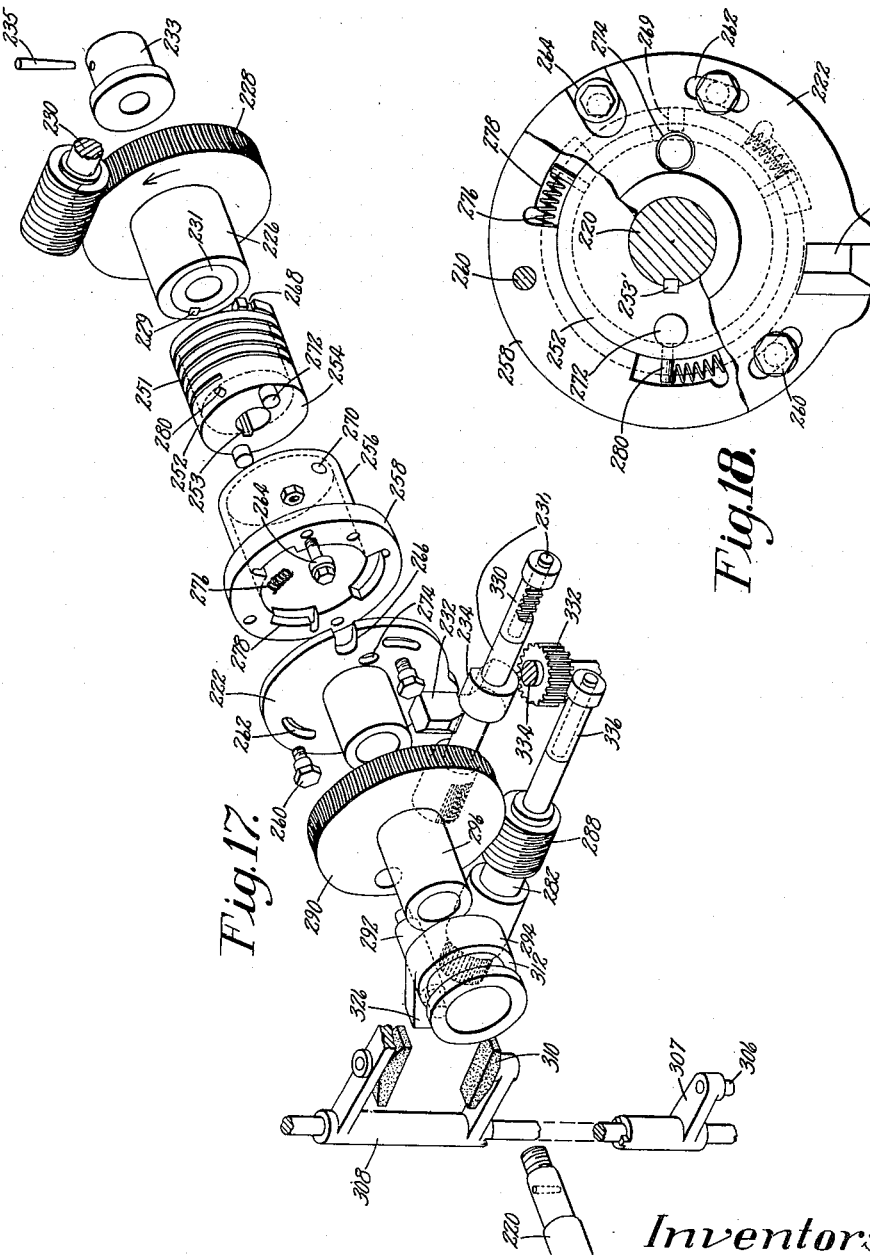
*Inventors*
Frank E. Cole
William V. Goodhue
Roland Heeley
By their Attorney Patented Jan. 18, 1949

2,459,308

UNITED STATES PATENT OFFICE 2,459,308

FUSE SETTING AND RAMMING MECHANISM

Frank E. Cole, Manchester, William V. Goodhue, Ipswich, and Roland Heeley, Beverly, Mass., assignors to United Shoe Machinery Corporation, Flemington, N. J., a corporation of New Jersey Application October 30, 1945, Serial No. 625,510

12 Claims. (Cl. 89—6.5)

This invention relates to fuse-setting and ramming mechanisms for breech loading guns and it is herein illustrated as embodied in a mechanism of the type shown in an application, Serial No. 473,738, filed January 27, 1943, now Patent Number 2,442,401, dated June 1, 1948, in the names of Dabrasky, Goodhue and Taylor.

Mechanisms of the type illustrated in the above-mentioned application are particularly adapted for use with one-part ammunition in which the projectile is frictionally secured in the neck of a cartridge case. For guns of larger caliber, however, it is not possible to use one-part ammunition because of the weight of the component parts, and then separate loading or two-part ammunition is employed. The projectile or shell forms the first part and carries the fuse, if any. The propelling charge is enclosed in a cartridge case which is usually closed by a suitable plug, preferably brought against the rear end of the projectile as the round is loaded. The diameter of the cartridge case is substantially greater than that of the projectile and it is received in a correspondingly larger portion of the bore of the gun.

An object of the invention is to devise an improved mechanism of the type in which the fuse setting is accomplished while the projectile is alined with the bore of the gun and in which the ramming operation is so controlled that the cartridge case follows closely behind the projectile as it is passed into the gun substantially as if the two parts moved together.

In carrying out this object a fuse-setting mechanism is positioned directly behind the breech and successively acting ramming devices are positioned in series with one another and in tandem with and back of the fuse-setting device. The two parts of the ammunition may then be presented, usually by two different men, and the projectile retained at the fuse-setting station until the second part of the round is brought into engagement with it.

A feature of the invention will be found to reside in improved control mechanism responsive to the stalling of the second ramming device, when the cartridge case is brought into contact with the projectile, to initiate the fuse-setting operation and the subsequent withdrawal of the parts of the fuse-setting device which have temporarily interrupted the progress of the round. Feed rolls, as in the prior device, are supported for yielding lateral displacement, they being urged inwardly against the round. As previously explained, however, the projectile is smaller in diameter than the cartridge case and in many projectiles the rear end tapers inwardly. Accordingly, there would be a tendency for the forward rolls to be separated by a corresponding small distance, when the projectile leaves them, with the danger that they may grab too vigorously when struck by the plug of the cartridge case. To forestall this difficulty a lost-motion rigid connection is provided between the successive sets of feed rolls. This is so arranged that the forward rolls may never close in too far but will be held apart by the rigid connection because the oncoming cartridge case of larger diameter is then spreading the rear rolls.

Still another feature of the invention is designed to prevent balloting of the projectile when it is released by the fuse setter and is passed forward into the gun. To this end, a latch is provided which interrupts the action of a spring in opening the fuse-setter jaws and allows them to drag frictionally against the sides of the projectile, thereby serving to guide it. The latch is released after the projectile passes these jaws by the action of the cartridge case which, due to its increased diameter, further spreads the fuse-setter jaws and trips the latch.

Inasmuch as a mechanism of this general type may well be employed for armor piercing shells in the use of which no fuse setting is required, provision has been made herein of a manually operated member by the adjustment of which the fuse-setting part of the control mechanism is by-passed, without interfering with the operation of the ramming mechanism when thus adjusted. The movement of the projectile is interrupted by the engagement thereof with fuse-setting jaws, and then, when the ramming rolls bring the cartridge case into contact with the projectile, these jaws are released and the feed rolls are rotated at a higher speed to force the two parts of the round into the gun.

These and other features of the invention will best be understood from a consideration of the following specification taken in connection with the accompanying drawings, in which Fig. 1 is a side elevation of the gun on its carriage, showing the relation thereto of the motor, the control devices and the fuse-setting and ramming mechanisms;

Fig. 2 is a vertical section through the breech end of the gun and the ramming and fuse-setting mechanisms taken along the line II—II of Fig. 3;

Fig. 3 is a plan view of these latter mechanisms;

Fig. 4 is a horizontal section through a fuse-jaw operating rod and a latch therefor;

Fig. 5 is a rear elevation of the gun carriage, looking into the ramming mechanism and showing the back end of a control box;

Fig. 6 is a vertical section on the line VI—VI of Fig. 3 with parts broken away and showing the fuse-setting mechanism;

Fig. 7 is a horizontal section through one set of the feed rolls, showing the latter separated as when a cartridge case is being expelled after firing the gun;

Fig. 8 is a vertical section through the fuse-setting mechanism taken at right angles to Fig. 5 but showing the fuse-setting jaws withdrawn to permit the shell to be passed into the gun;

Fig. 13 is a vertical transverse section approximately on the line XIII—XIII of Fig. 10 and showing particularly the escapement mechanism;

Fig. 14 is a horizontal section taken on the line XIV—XIV of Fig. 13 and illustrating particularly parts of the fuse-setter-control mechanism;

Fig. 15 is an elevation, partly in section, of the low and high speed clutches for the feed-roll-driving shafts;

Fig. 16 is an elevation, on a larger scale, of a fuse-setter-by-pass mechanism for use when firing armor-piercing shells;

Fig. 17 is an exploded angular view of the elements of the fuse-setter-control mechanism; and Fig. 18 is an end view, with parts broken away, of a wrap-around-spring clutch included therein.

Figure 1:
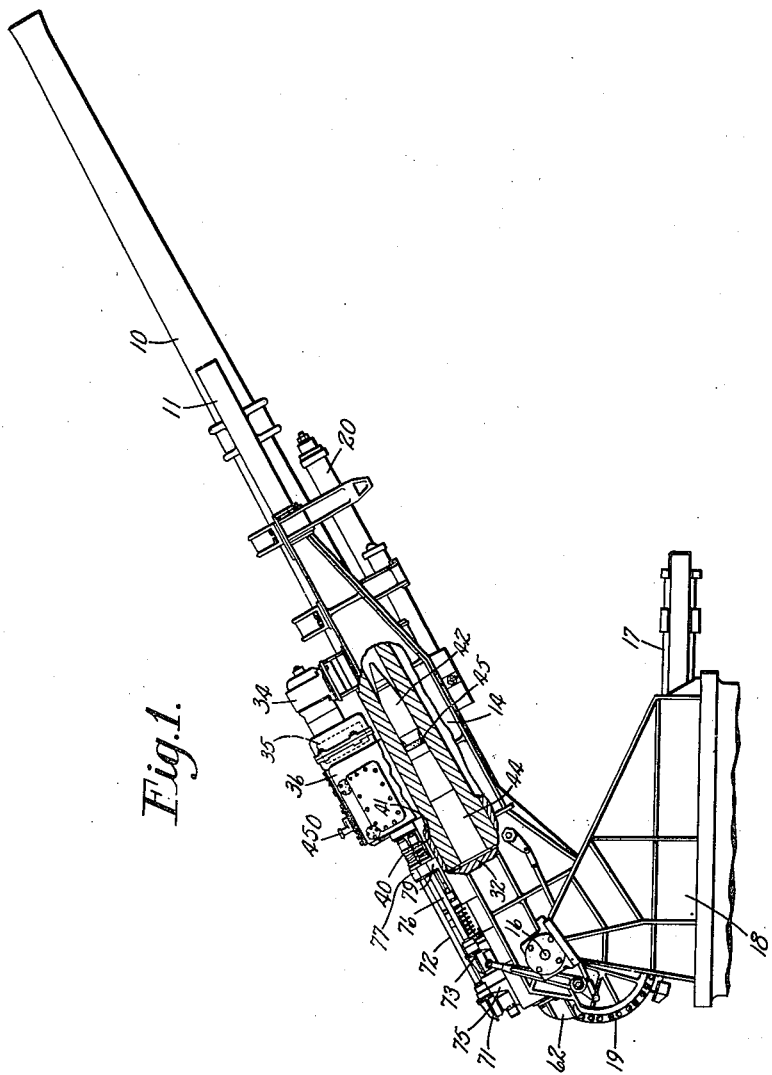

The invention has been herein illustrated as applied to an antiaircraft gun 10 (Fig. 1) slidably supported by rails 11 riding in guides 12 (Figs. 5 and 13) forming a part of a cradle 14 having trunnions 16 tiltable in a suitable support 18. An equilibrator 17 is connected to the cradle by chains 19, and recoil cylinders 20 are secured directly to the cradle. The ramming and fuse-setting mechanism comprises a casing 22 (Fig. 2) having cover plates 24 and 26, the casing being supported by means of bolts 27, 28 (Fig. 3), and 29 (Fig. 2) upon the breech ring 30, and this latter is provided with guides for a vertically slidable breechblock 32. Power is supplied to these mechanisms from an electric motor 34 (Fig. 1), through a control box 36, both supported upon the cradle, and is transmitted to the fuse-setting mechanism through a coupler 38 (Fig. 14) and to the ramming mechanism through separable dog clutches 40 and 41 (Fig. 15). When the gun recoils, the fuse-setting and ramming mechanisms move with it, while the motor and the control box remain fixed upon the cradle 14.

*Ramming mechanism*

The ammunition is delivered to such a gun in the form of a two-part or separate-loading round (Fig. 2) comprising a shell 42 and a separate cartridge case 44 which contains the propelling charge, retained by a plug 45, and has the usual flange 46 (Fig. 7). The shell may be of the armor-piercing type, when the fuse will be embodied in a base plug (not shown), or it may be provided with a time fuse having a rotatable setting ring 48 associated with graduations 49. The setting of the fuse is effected, as later described, while the round is positioned in alinement with the gun barrel with the plug of the cartridge case held against the end of the shell, and, immediately thereafter, the round is passed into the gun barrel, whereupon the breechblock is closed and the gun fired. The simultaneous ramming of the cartridge case with the projectile is desirable because of the air pocket which would be formed behind a previously rammed projectile 42 (Fig. 1) and the resistance offered by this air pocket to the subsequent entry of the cartridge case 44. Closure of the breechblock is effected automatically when the flange 46 upon the cartridge case engages the lips 51 (Fig. 2) of an extractor 53 which is pivoted in the breechblock 32. The consequent rocking of this extractor clockwise moves its trunnions from the locking position shown to a release position in the grooves shown in dotted lines so that a spring (not shown) acting through an arm 55 will raise the breechblock into position to close the rear end of the barrel of the gun ready for firing. Any suitable arrangement may be employed for opening the breechblock 32 after the gun has been fired. One such arrangement acts through the arm 55 to lower the block during counterrecoil.

The ramming mechanism herein illustrated is provided with two pairs of feed rolls 50 (Figs. 2 and 5) each roll comprising opposed frusto-conical surfaces of resilient material 52. Each feed roll is provided with a shaft 54 (Fig. 7) mounted in suitable bearings in the arms of a swinging carrier 58. The cooperating rolls 50 of a pair (Figs. 3 and 5) are swung into engagement with the periphery of the round and are yieldable, in a manner to be described, so that they may cooperate with the varying diameters of the round as it moves into the gun. An apertured end plate 60 (Fig. 2) of the casing 22 provides a support for a bracket 62 on which are carried idle rolls 64 which assist in centering the round as it is presented to the ramming mechanism. Each feed roll carrier 58, as shown in Figs. 2 and 7, swings on a jack shaft 66. Each shaft 66 is supported upon a bearing 68, and those at the right side of the rammer have at their upper ends bevel gears 70 (Fig. 5) within housings 71 and 73 (Fig. 3) carried by the cover plates 24 and 26, respectively. The bevel gears 70 for the rear rolls join them to an upper drive shaft 72 at the forward end of which is one-half of the clutch 40, this half being splined to the shaft and capable of yielding against a spring 74 (Fig. 3). The shaft 72 is carried in bearings 75, 77 (Fig. 1) mounted on the cover 24 and on a casting 79 attached to the breech ring 30. The forward rolls are geared to a similar shaft 76 underlying the shaft 72 and terminating in a half of the clutch 41. Each jack shaft 66 has, at its lower end, a pinion 78 (Fig. 2) meshing with a pinion 80 on the roll shaft, thereby to drive the roll. The pinions 78 on opposite sides of the rammer are interconnected by gears 82 (Fig. 7). By this arrangement, the supply of power to the cooperating rolls of a set is independent of the positions of the carriers, and it will later be shown that, after firing the gun, these carriers are swung aside to provide a free passage for the expulsion of the cartridge case 44, as indicated in Fig. 7. This is facilitated by a guide tube 81, apertured as at 83 (Figs. 2 and 7) to admit the feed rolls, and by a deflector spring 85 (Figs. 2 and 3). Inasmuch as the forward feed roll elements beneath the cover 26 are identical with those already described, no further description will be given of these parts, and the same numerals will be applied thereto.

Separation of the adjacent feed roll carriers is effected by a spring 86 (Fig. 2) surrounding a rod 88 and bearing at one end against a collar 90 secured to the rod and at its forward end against a block 92. The forward end of the rod 88 is anchored in a lug 89 bolted to the casting 79. This block 92 is slidable on the rod 88 and has its lower end threaded to a rod 94 which is yieldably connected to the feed roll carriers. This yieldable connection is effected by coil springs 102 and 104, abutting yokes 96 (Fig. 3) which are joined by links to arms 97 on the carriers, and are slidable upon the rod 94 against bumpers provided in collars 100 which are secured to the rod 94. The spring 102 abuts a collar 103 at one end and a yoke 96 at the other end, while the spring 104 is interposed between a sleeve-like collar 106, which is secured to the rod 94, and the rear yoke 96. This sleeve-like collar 106 is slidable within a projection 108 integral with the cover 24, which projection 108 serves furthermore as a support for the rear end of the rod 88. Depending portions of the yokes 96 are joined by a rod 95 which has spaced nuts 99 providing a lost-motion connection to the forward yoke (at the right in Fig. 2). A shoulder on the rod, together with a nut 101, furnishes a firm connection to the rear yoke. No interconnection between the yokes, when using two-part ammunition, would permit the forward rolls to move in unduly, as the shell leaves them and moves forward through the fuse setter, and hence to grab the corners of the approaching plug 45 with a danger of pulling loose from the case 44. On the other hand, if a connection of fixed length were used between the yokes, the case 44 with its larger diameter, entering the rear rolls, would cause the forward rolls to be spread apart too far to contact the shell. The lost-motion connection avoids these dangers. The reduced forward end 110 of the rod 94 is positioned for engagement with an abutment 112 (Fig. 3) formed on the control box 36. Accordingly, when the gun is in battery position, as shown in Fig. 2, this rod 94 is pushed back against the spring 86, thereby to hold the feed rolls 50 (Fig. 3) resiliently, through springs 102 and 104, against the sides of the round of ammunition, accommodating variations in diameter from point to base, and variations between the shell and the case. Upon recoil, the already compressed spring 86 expands and, acting through the block 92, moves the rod 94 forward to swing the feed roll carriers outward to the position shown in Fig. 7 where there is sufficient space to permit a free passage of the expelled cartridge case 44.

Fuse-setting mechanism

The parts of the rotatable, hollow fuse-setting mechanism which grasp the fuse-setting ring 48 of a shell presented to it are supported in the forward end of the casing 22. Firm engagement of the mechanism with the ring 48 is effected by sharp-edged disks 120 (Figs. 2, 6 and 8) mounted in a trio of jaws 122 which are pivotally carried on pins 124 extending between arcuate portions 126 which, with the side plates 128 and 130, go to make up a rotatable cage 131 mounted on ball bearings 132 for rotation around the axis of the gun. The side plates are frictionally held in clamping engagement with the sections 126 by means of transverse screws 134. The outer surface of the cage is cylindrical and supports a sliding ring 135 made up of a ring 136 reinforced by flat annuli 138 held thereon by bolts 139 (Fig. 8). An annular sleeve 140 surrounds and tightly frictionally engages the ring 135, being gripped by the annuli 138, and having, on its outer surface, parallel peripheral grooves which constitute a rack enabling the ring to be moved along the axis of the gun from one end to the other of the cage 131 in a manner to be described. Extending between the ring 135 and the jaws 122 are links 142 which, when the ring 135 is forward, as in Fig. 2, extend substantially radially and hold the disks 120 in firm engagement with the fuse ring 48. When, on the other hand, the ring 135 is slid to the position shown in Fig. 8, these arms 142 are drawn into recesses provided in the cage so that they are completely out of the path of the cartridge case 44 as it moves into the gun or when it is expelled after firing.

Fractional rotation of the cage 131 around the axis of the gun to set the fuse ring 48 is effected by power delivered to an annular gear 144 formed on the side plate 130. This gear meshes with a pinion 146 (Fig. 6) within a casing 147. The pinion 146 in turn is driven by a pinion 148 upon an operating shaft 150 for the fuse setter. This shaft 150 carries part of the coupler 38 (Fig. 14) and receives power through the control box 36 at appropriate times. For sliding the ring 135 upon the cage to move the arms 122 in and out, power is received from a sliding rack 152 (Figs. 3 and 6) meshing with a pinion 154 on the upper end of a shaft 156 (Fig. 6). This shaft 156 is provided with a pinion 158 meshing with the ring-like rack 140, and the shaft serves also to drive other shafts which are provided with pinions 160 and 162 also meshing with the rack 140 so that there is no tendency to cramp the ring upon the cage.

Motor drive

Power is supplied from the motor 34 (Fig. 1) which is coupled to a flywheel 35 and thence, through an overload clutch 168 to the forward end of a drive shaft 170 (Figs. 9 and 10) contained within the control box 36, (a) to rotate the feed rolls, thereby to carry the shell against the fuse-setter jaws and the cartridge case against the shell, (b) to turn the fuse setter, thereby to set the fuse in accordance with data received from a director, (c) to then move the jaws out of the way, and (d) to drive the feed rolls at a higher speed, thereby to carry the round into the gun. The breech is then closed automatically and the gun fired as desired, either automatically (not shown) or manually (not shown).

Control mechanism

Figure 9:
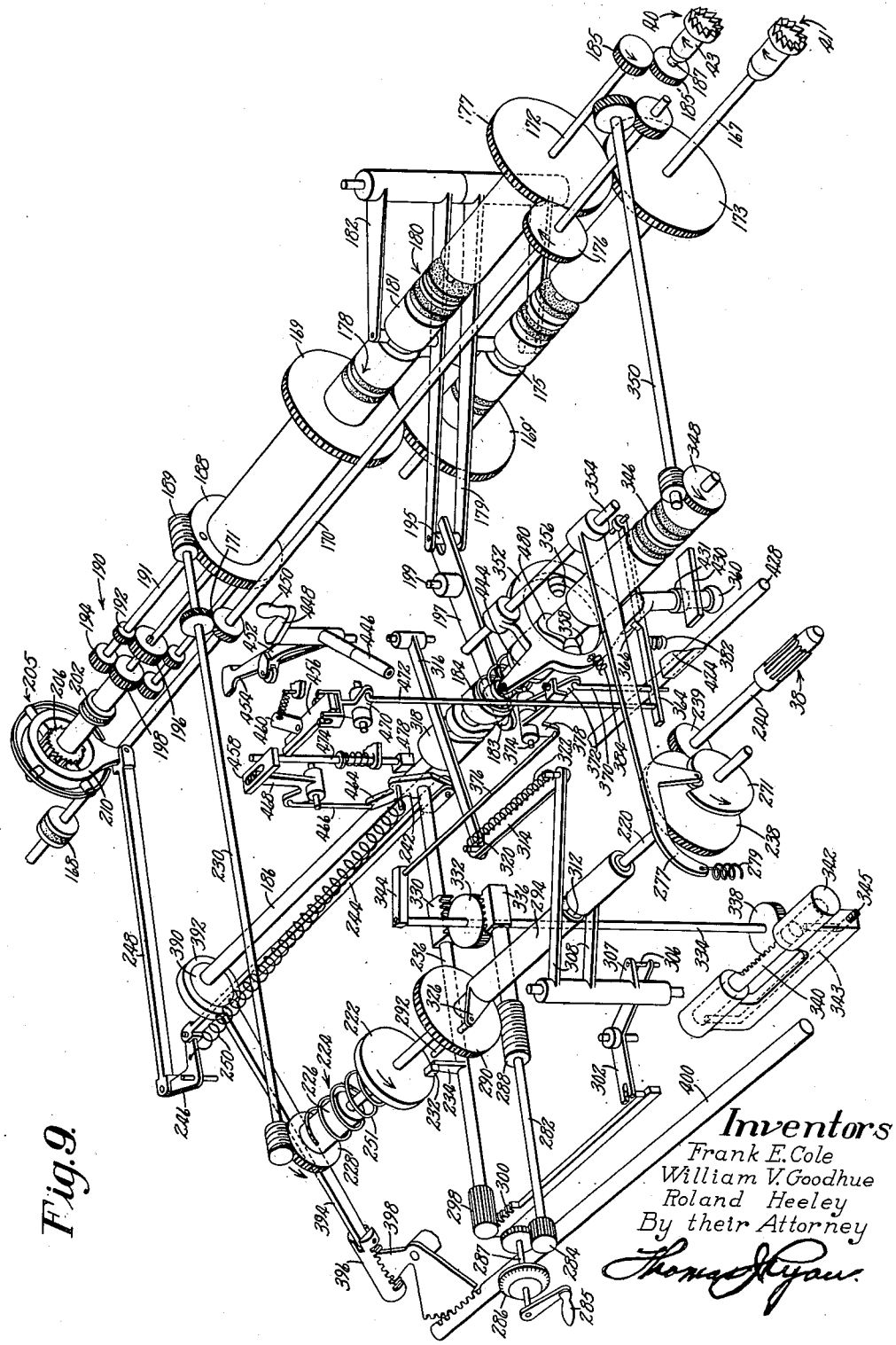
Fig. 9 is a schematic view of the mechanism contained within the control box and by means of which the sequence of events is determined.
Figure 10:
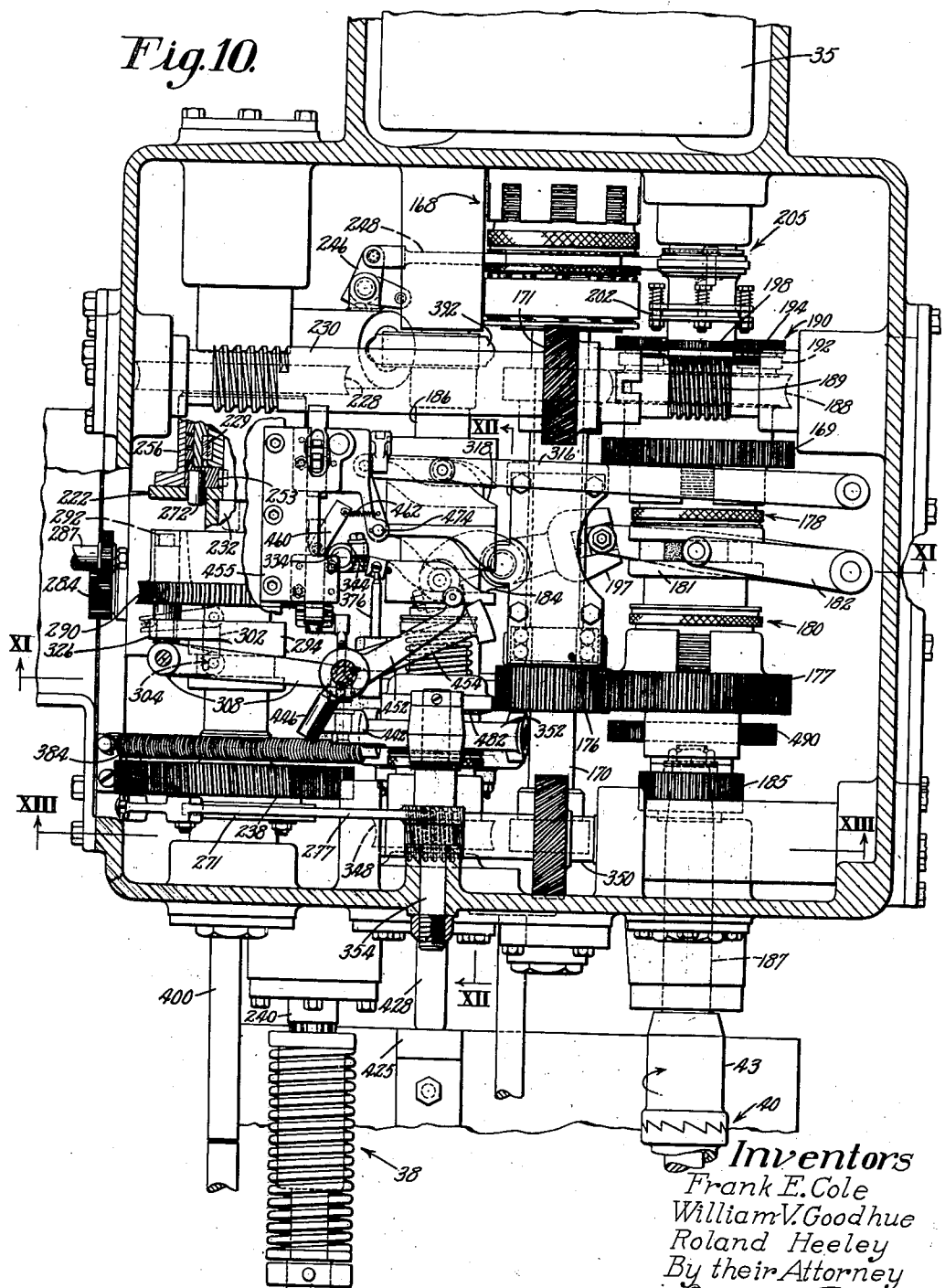
Fig. 10 is a plan view of the control-box mechanism with the casing cut away just below the cover.

To determine the setting of the fuse and to control the sequence of operations, a control mechanism, shown diagrammatically in Fig. 9, is provided within the control box 36. In this control mechanism the power of the drive shaft 170 is transmitted to an upper clutch shaft 172 through either a low-speed connection including gears 171, a countershaft 230 (Figs. 9 and 11) and a worm 189 meshing with worm gear 188, or through a high-speed connection embodying gears 176 and 177 (Figs. 9 and 13), depending upon which one of two clutches 178 or 180 is closed by the action of a sleeve 181 splined to the shaft 172 and moved by a speed shipper 182 (Fig. 10). The shaft 172 is provided at its rear end with a pinion 185 meshing with a pinion 185' on a stub shaft 187 (Figs. 9 and 14) carrying one part 43 of the dog clutch 40 by means of which power is supplied to drive the feed rolls. The worm gear 188 comprises a part of a differential 190, shown in Figs. 10 and 15.

Another clutch shaft 167, for the forward feed rolls, terminates in a part of the clutch 41. It is journaled in the control box below the shaft 172 (Fig. 15) and is provided with low- and high-speed clutches joined to the similar clutches 178 and 180 by meshing gears 169—169' and 177—173. A grooved sleeve 175 on the shaft 167 is moved to lock one drive or the other to the shaft by means of a shipper 179 which has one arm joined to an adjacent arm of the upper shipper 182 by a stud supporting a block 195 (Fig. 14). This block engages the forked end of a cam-actuated lever 197 (Figs. 10 and 11) swinging on a pin 199 and having a roll 183 which is received in the groove of a barrel cam 184 on a cam shaft 186. The speed of rotation in revolutions per minute of the two sets of drive rolls is equal, but the engagement of the rear rolls with the cartridge case is at a point of larger roll radius and consequently the linear speed of the case is slightly greater than that of the shell. This means that the plug 45 of the cartridge case 44 is held firmly against the shell during the high-speed ramming movement, thus helping to prevent balloting of the shell. When a shell is delivered to the ramming mechanism, it is engaged first by the rear feed rolls and then by the forward rolls which carry it into engagement with the fuse-setting jaws where it is stopped temporarily. This will cause the drive for the forward rolls to stall, slipping the low-speed clutch for the shaft 167.

*Differential*

The differential 190, by reversing when the rear feed rolls stall because the round they are ramming has been stopped in its forward travel by contact of the shell with the fuse-setter jaws and by contact of the plug 45 with the shell, "pulls the trigger" to start the fuse-setting operation. The differential itself comprises a pair of studs 191 (Fig. 9) supported on the worm gear 188 and each carrying a rotor provided with pinions 192 and 194. These rotors are free to revolve upon the studs 191. Meshing with the inner pinions 192 is a gear 196 which is keyed on the shaft 172 and meshing with the pinions 194 is a gear 198 freely rotatable on the shaft and common with one half of a friction clutch 202 terminating in a ratchet-like rotor 206 which is part of an overriding clutch 205. The latter clutch is made up of pawls slidable radially in a ring 210 and spring held in engagement with the teeth of the rotor 206.

*Fuse-setter shaft*

On the other side of the control box from the clutch shaft is a fuse-setter shaft 220. Mounted on this shaft for limited angular movement with respect thereto is a controller 222 (Figs. 9, 10 and 17), constructed as in said prior application of Dabrasky et al., and connected by a wrap-around-spring clutch 224 with a sleeve 226 splined at 229 (Fig. 17) to the hub 231 of a worm gear 228 which is constantly rotated by means of the countershaft 230 connecting it, through helical gears 171, to the drive shaft 170. The gear 228 is held against movement axially of the fuse-setter shaft by a collar 233 locked to the shaft by a pin 235. The controller 222 is also known as a release plate and on it is a shoulder 232 held by the clutch 224 in engagement with the side face of a block constituting a zero stop 234 which is integral with a transverse stop-shaft 236. When the zero stop 234 is turned out of the way of the shoulder 232, the controller 222 is rotated through a portion of a revolution, carrying with it the fuse-setter shaft 220 and driving, through the gears 238, 239 (Figs. 9 and 13), a fuse-setter coupling shaft 240 which carries a portion of the coupler 38. The stop 234 is moved out of the way of the shoulder 232 by turning the transverse shaft 236, and this is done through a crank-like lever 242 on this shaft joined by a link 244 to a bell crank 246 which in turn is joined by a link 248 to the ring portion 210 of the overriding clutch.

Thus, when the rear feed rolls stall, by reason of the engagement of the cartridge case with the previously stalled shell which is abutting the fuse-setter jaws, the low-speed clutch 178 of the drive shaft 172 for these rolls will slip and the differential 190 will cause the ring 210 to be turned clockwise, as seen in Fig. 9, the zero stop 234 to be withdrawn, and the fuse to be set. Substantially as soon as the fuse has been set, the fuse-setter jaws 122 are partially withdrawn, as will be later described, and the round is permitted to pass on into the gun. Thus, the stalling action of the rolls on the differential 190 is relieved, and the zero stop 234 is drawn back into the path of the shoulder 232 by a tension spring 250 extending between the lever 242 and the bell crank 246.

*Wrap-around-spring clutch*

The construction of the wrap-around-spring clutch 224 is shown in Figs. 17 and 18 where it will be seen that the spring 251 is cut in a cylinder 252 having a closed end 254 which is held to the shaft 220 by a key 253' (Fig. 18) in a keyway 253 (Fig. 17). The spring portion of this member closely surrounds the hub sleeve 226 and is contained within a flanged casing 256, to the flange 258 of which the controller 222 is clamped by screws 260. These screws pass through slots 262 permitting adjustment of the position of the controller with respect to the flange by means of an eccentric stud 264 engaging a radial slot 266 in the controller and held by a nut on the opposite side of the flange. The free end of the spring 251 is notched at 268 to receive a pin 269 (Fig. 18) projecting radially inwardly of the casing 256 through a hole 270. On the closed end 254 of the spring cylinder 252 are studs 272 slightly smaller than and received in openings 274 in the controller 222. In assembling these parts the eccentric 264 is turned until the studs 272, integral with the closed end of the spring, are brought to a position substantially central of the openings 274 in the controller 222 during driving conditions and are moved in a counterclockwise direction (Fig. 18) against one side of these openings 274 when the clutch is released. Booster springs 276 received in notches 278 formed in the casing flange 258 bear against pins 280 extending radially from the clutch spring sleeve 252. It will be understood that there is a slight constant friction between driven hub sleeve 226 and the spring 251 acting in a direction which would, if it could, rotate the fuse-setting shaft 220 in a counterclockwise direction, as viewed in Figs. 9 and 17, thus holding the shoulder 232 in engagement with the zero stop 234. It is essential, however, in view of the amount of power which is transmitted by this clutch, that the friction between the spring 251 and the sleeve 226 shall not be excessive between successive fuse-setting operations. Accordingly, there has been provided upon the gear 238 (Fig. 9), at the near end of the fuse-setter shaft, a cam 271 (Fig. 13) whose periphery is a spiral having its ends joined by a surface 273 which is inclined slightly with respect to a radius of the gear. Resting against the cam is an antifriction roll 275 which is carried by a depending portion of a lever 277 urged downwardly by a spring 279 joined at its lower end to a pin on a bracket attached to the control box. The lever 277 is carried by a pin 354 (Figs. 10 and 13). This cam 271 is so positioned with respect to the fuse-setter shaft that the roller 275 comes to the brink of the upright surface 273 just as the shoulder 232 of the controller contacts the zero stop 234. The spring 279 is then effective to cause the roller 275, dropping down the surface 273, to push the cam and, hence, the fuse-setter shaft a very small distance counterclockwise, as viewed in Fig. 13. As a consequence, since the position of the controller 222 cannot change, the spring 251 is unwrapped slightly from the hub sleeve 226 and the friction is lessened. As soon as the zero stop is moved out of the way by the overriding clutch 205, the spring 251 grips the hub sleeve 226 because of the action of the booster springs 276 and the shaft 220 is given a partial revolution from the continuously driven countershaft 230 thereby to set the fuse. The extent of this rotation is determined by the setting of a data shaft 282 which has a gear 284 meshing with a pinion provided with a shaft 287 having a handle 285 by means of which it may be turned to a position indicated by a dial 286 in accordance with the desired number of seconds delay in the bursting of the shell as determined by information received from the director.

Set and-reset mechanism

The end of the fuse-setting rotation of the shaft 220 is determined by engagement of the shoulder 232 on the controller with a stop known as a data pin 292 which, as later described, is slidable in directions parallel to the shaft 220. The data shaft 282 forms part of a so-called "set-and-reset" mechanism and is provided with a worm 288 meshing with a worm gear 290 free for rotational adjustment on the fuse-setter shaft 220. As will be seen from Fig. 17, this gear 290 is perforated to receive the data pin 292 supported on and axially yieldable with an arm 326 carried by a grooved collar 294 which is mounted so that it may slide on the hub 296 of the worm gear 290. When the collar slides, the pin slides with it in the hole in the gear 290. The previously described turning of the stop shaft 236 (Fig. 9) to start the fuse-setting operation, acts through a gear 298, a rack 300, and a latch 302 to draw a notch 304 (see also Fig. 14) in the latch away from a pin 306 on a lower arm 307 on a shipper 308. This shipper has a yoke provided with shoes 310 (Fig. 17) for engagement in a groove 312 of the sliding sleeve 294. The uppermost arm of the shipper yoke is joined by a link 314 to a swinging arm 316 the movements of which are controlled by a cam 318 on the cam shaft 186. The connection between this link 314 and the swinging arm 316 includes a slot 320 (Fig. 9) and a spring 322 so that the data pin 292 will be immediately moved into the path of the controller shoulder 232 as soon as the notch 304 of the latch is drawn away from the pin 306 of the shipper, this movement being effected by the spring 322. The position of the data pin determines, therefore, the degrees of fractional rotation of the controller 222 and hence of the fuse-setting shaft 220 and, as soon as the shoulder 232 engages the data pin 292, this controller 222 acts as a clutch-release plate, serving to unwrap the spring 51 from the hub 226. Since this sleeve 294 carrying the arm 326 which supports the data pin 292 is loose upon the hub 296 of the worm gear, the shipper may be operated in any position of the data pin.

On the stop shaft 236 is a sleeve 330 having rack teeth (Fig. 17) which mesh with a pinion 332 carried on a vertical shaft 334. Engaging the other side of this pinion 332 is another rack 336 formed upon a sleeve which is loose on the data shaft 282, thus providing a whiffletree connection between said shafts.

When, in the operation of turning the fuse-setter shaft 220, the shoulder 232 moving counterclockwise strikes the data pin 292, the reaction through the worm gear 290 tends to displace the worm 288 and its shaft 282 in a direction axially of said shaft 282. This slight movement is transmitted through the pinion 332 to the vertical shaft 334 which is provided at its top with an arm 344 (Figs. 9 and 14). This arm operates through an escapement mechanism, to be described, to cause a half revolution of the cam shaft 186 as the latter is driven by a plate friction clutch 346 (Figs. 9 and 12) interposed between the cam shaft and a gear 348 free on the cam shaft and connected to the drive shaft 170 by means of an intermediate shaft 350. To soften the movements of the fuse-setting control mechanism, the lower end of the vertical shaft 334 is provided with a gear 338 (Fig. 9) which meshes with a rack formed upon a double-ended piston 340 the ends of which slide in a casing 342 which, in the actual construction, is formed in the casting shown at the bottom of the control box in Fig. 13. This piston 340 and the casing 342 serve as a double-acting dashpot and to this end the cylinders of the casing 342 are interconnected by a passage 343 (Fig. 9) having an orifice control screw 345.

Escapement mechanism

Controlling the cam shaft to produce successive half rotations thereof is an escapement mechanism comprising a ring-like pendulum 352 (Figs. 9, 10, 12 and 13) swinging upon a pivot pin 354 carried by the box 36 (Fig. 12) and having tapered cam rolls 356 and 358 (Fig. 13). This escapement pendulum has at its lower end an antifriction roll 360 which is used when it is desired to reset the pendulum and, offset therefrom, a lug adapted for engagement with a horizontally positioned latch 364 pivoted on a casting 365 (Fig. 13) which is attached to the box 36. The latch has an upward projection 366 for engagement with the lug of the pendulum. Depression of this latch to permit the escapement to start the rotation of the cam shaft 186 is effected by a depending trigger pin 370 (Figs. 9, 12 and 13) which is hinged on the end of a lever 372 (Figs. 9 and 16) parallel to the drive shaft. The lever 372 is pivoted in turn on a fixed pin 374 and is arranged to be depressed by the overhanging end of one arm of a bell crank 378 which is also pivoted on the pin 374 and is joined by a rod 376 to the arm 344 which is moved by the set-and-reset mechanism. A spring 382 (Fig. 16) supports the latch 364 in position to engage the escapement pendulum and hold it in the position shown in Fig. 13. The pendulum is held against the lug 366 on the latch by means of a tensioned spring 384 tending always to turn the pendulum in a clockwise direction so that the roll 360 would move to the left in that figure.

These half rotations of the cam shaft, started by swings of the pendulum, do a number of things. One of them follows the fuse-setting operation and is effective, through the cam 318, to recock the shipper 308, thereby to pull the data pin 292 out of the path of the shoulder 232 and to allow the fuse-setter controller to return to starting position. In so doing, the controller shoulder 232 will, by impact with zero stop 234, axially displace the stop shaft 236 to bring it back to its original position and, by reason of the coaction of the racks 330 and 336 with the intermediate gear 332, it will move the worm 288 and hence carry the data pin 292 to its preset starting position. It also operates the shipper 179, 182 to drive the feed rolls at high speed, 1100 R. P. M., for example, instead of 200 R. P. M. at low speed, and furthermore it turns an eccentric 390 which is surrounded by a strap 392 (Fig. 9) attached to a connecting rod 394 which is pivotally connected (Fig. 14) to a rack 396. The motion of the rack is transmitted, around a corner of the control box, by means of a double segment 398, to draw back into the box a rod 400 which lies at the lower left-hand corner of the control box, as shown in Fig. 13, and thus permits withdrawal of the fuse-setting jaws 122 to the position shown in Fig. 8 and then to a partly closed position determined by a latch 432 (Fig. 4) to be described.

Later, during recoil of the gun, the escapement pendulum is returned to the low-speed position and latched, this movement having been caused by the action of a cam block 424 carried by a rod 428 as it is moved rearwardly by a surrounding spring 429 (Fig. 14). This recocking of the escapement pendulum will cause a second half revolution of the cam shaft, causing the speed shipper 182 to shift back to its low-speed position. At the same time, the cam lever 316 swings forwardly so that the shipper 308 will be free to move the data pin 306 into the path of the shoulder 232 when tripped by the differential in the following cycle. It will also cause the rod 400 to again project from the control box in order to close the fuse jaws as the gun returns to battery position.

*Fuse-setter-jaw movements*

The rod 400 is in alinement with a rod 402 (Fig. 3) connected to the fuse-setter jaws and slidably mounted in brackets 404 and 406 on the breech ring. This rod 402 is normally pushed forwardly of the gun by means of a surrounding jaw-release spring 408 acting against a collar 409 on the rod and, when so pushed forward, it will carry with it the rack 152 (see also Fig. 6) which will slide the rack-like sleeve 140 (Fig. 9) surrounding the fuse-setting cage and cause the fuse-setting jaws to be withdrawn. The rear end of the rod 402, at the left in Fig. 3, is positioned within a slidable rack-block 410 guided by ways 411. This block supports the rack 152 and in it there is threaded a cylinder 412 (Figs. 3 and 4). The cylinder 412 contains a spring 414 the compression of which, adjusted by a screw 416, is such that normally it does not yield. If the fuse-setting jaws are accidentally obstructed by some foreign body as the gun returns to battery, this spring 414 will yield and avoid breakage of the parts associated with the opening and closing of the fuse-setting jaws. Threaded on this cylinder 412 are bumpers 418 and 420 provided with brass rings adapted to engage the opposite ends of a guide bracket 422 which is integral with the casing 22. Thus in one position of the eccentric 390 (Fig. 9) the rod 400 will be effective to push the rod 402 into the position shown in Fig. 3 where the fuse-setting jaws are in their inner position ready to catch a shell as it is fed to them. In its other position, the eccentric 390 draws back the rod 400 into the control box, whereupon the spring 408 (Fig. 3) partially opens the fuse-setting jaws so that the shell may be pushed forward into the gun, and this takes place at approximately the same time as the speed of the feed-roll drive is increased. At the end of a fuse-setting operation, full opening of the jaws is prevented by a latch 432 (Figs. 3 and 4) engaging the collar 409 on the jaw-opening rod 402 as the latter starts to move under the action of its spring 408. This latch is mounted on a vertical pin 434 in the bracket 404 and urged by a spring 436 into the path of the collar 409. A bar 438 for releasing the latch is guided in the bracket 404 with its forward end in position to swing the tail of the latch. This rod is threaded in and hence can be adjustably positioned in a lug 440 which is secured to the rack-block 410. The fuse-setting jaws are, therefore, left in yielding engagement with the shell to guide it and to prevent balloting as the feed rolls, driven at high speed, carry it forward into the gun. The cartridge case is enough larger in diameter to spread the fuse-setter jaws, as it passes through them, thus swinging the segment 154 and moving the rack-block 410 and the attached rod 438 to release the latch and allow the jaws to be fully opened by the spring 408.

Figures 11, 12:
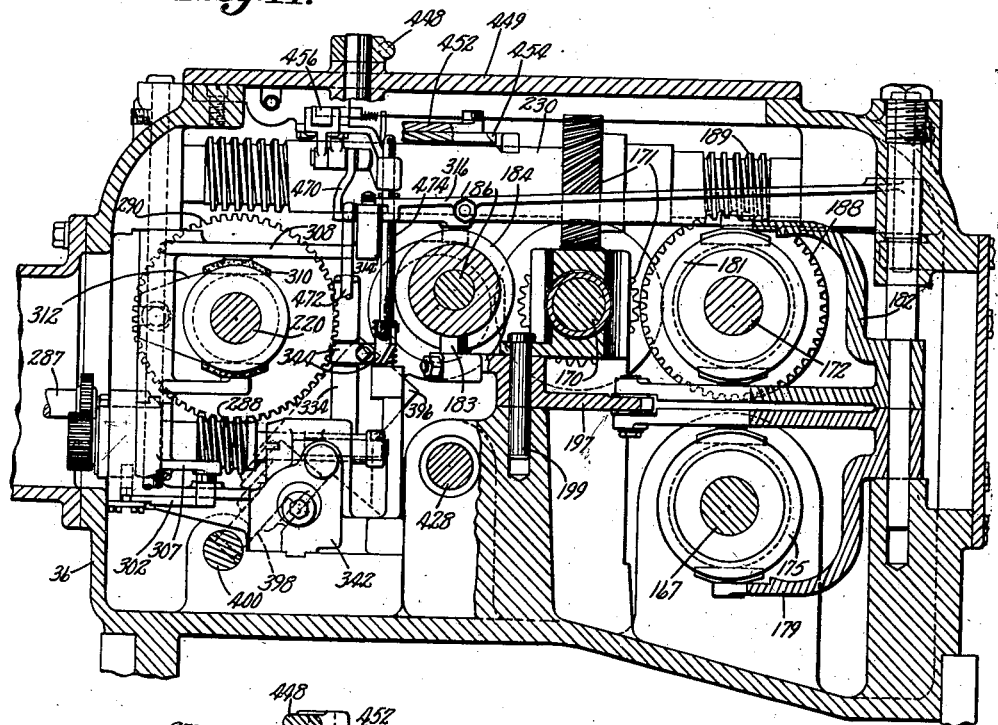
Fig. 11 is a vertical section on the line XI—XI of Fig. 10 showing a double clutch shipper.
Fig. 12 is a side elevation, with parts in section, of an escapement mechanism which is taken approximately at the plane XII—XII in Fig. 10.

After these operations during which the escapement pendulum 352 has remained at the left, there comes a time, as mentioned above, when it is desired to swing it back to its original position where it will be again caught by the latch 364. This is effected by means of the block cam 424 having a vertical cam surface 426 (Figs. 13 and 14). This cam is secured to a rod 428 in the control box 36. This rod, at its rear end, rests against a lug 425 projecting up from the breech ring 30 (Figs. 3 and 14) and, at its front end, has a shoulder engaging a spring 429 which abuts the control box 36. To support the cam 424 against turning, it rides on guide arms 427 attached to a casting 365 (Figs. 12 and 13). During recoil, the breech ring moves away from the end of the rod 428 and thereupon the spring 429 moves the rod rearward, whereupon the cam 424 becomes effective to reset the escapement. As the pressure of the cam 424 against the roll 360, as well as that of an escapement cam 480, to be described, may be considerable, a thrust plate 430 is provided (Fig. 14) the edge of which forms a surface bearing for a thrust roll 431 also carried by the escapement pendulum 352, thereby to prevent it from being cramped upon its pivot 354.

*Fuse-setter by-pass for armor-piercing shells*

The escapement pendulum is also provided with a resetting roll 442 (Fig. 13) upon the upper end of an arm 444 (Figs. 9 and 16) integral with the pendulum, and this roll is in the path of movement of a stub pin 446 (see also Fig. 10) projecting from the inner end of a hand crank 448 carried by a cover 449 of the control box and having a latched handle 450. When it is desired to utilize the mechanism for armor-piercing shells, so that no fuse-setting operation is involved, the hand crank 448 is turned counterclockwise from the position shown in Figs. 9 and 10 to another position. During this movement the stub pin 446 passes over the roll 442, resetting the pendulum to its latched position, if necessary. Also attached to the hand crank 448 are a roll-carrying arm 452 and a wedge-carrying arm 454 for coaction with a mechanism shown in Fig. 16. This includes the parts 456 and 458 of a broken slide which parts are guided in a block 455 on the under side of the cover 449. Pivoted to the part 456 is a pusher block 460 normally drawn out of alinement with the slide parts by a spring 462. When the hand crank 448 is turned, the roll-carrying arm 452 will push the block 460 into alinement and cause the movement of the lever 242 on the zero-stop-carrying shaft 236 to be transmitted by an extension 464 on the crank through a push link 466 and a bell crank 468 to the slide part 458 and thence to the other part 456. The upward movement of the end of the extension 464 lifts a link 466 to swing a bell crank 468 connected to the slide part 458. The other slide part 456 is connected by a bell crank 470 to a trigger pin 472 the lower reduced end of which passes through a hole in the escapement latch 364. Turning of the hand crank 448 is also accompanied by a swinging of the wedge on the arm 454 to depress a rod 474. This is guided for vertical movement by a bracket on the guide block 455 and its lower end engages the top of a slide 476, normally elevated by a spring and having at its lower end a stop-block 478 capable of limiting the swing of the lever 242 to an arc less than the swing required to move the zero stop 234 out of the path of the shoulder 232 on the controller 222. As a result the fuse-setting mechanism is by-passed and no fuse setting takes place but the cam shaft shifts the drive to high speed and the ramming is completed. When it is desired to return to fuse setting, the handle is returned to the position shown in Figs. 10 and 13 and the stub pin 446 rides back over the roll 432 and pushes the escapement pendulum into the position of Fig. 13 where it is caught and held by the latch 364. The return of the handle will release the pusher block 460, allowing the latch 364 to become effective, and will also release the stop-block 478 so that the latter is raised out of the path of the lever 242, again permitting the fuse-setting cycle to be carried out.

*Escapement cam*

The escapement is made effective to control the rotation of the cam shaft 186 by its cooperation with a cam 480 (Fig. 12) splined to slide on the cam shaft and controlling the so-called "friction clutch" 346 of Fig. 9 which is a plate clutch interposed between the gear 348 and the cam 480. The latter has a substantially radial cam surface 482 (Fig. 10) cooperating with one or the other of the conical rolls 356, 358 on the escapement pendulum. This cam 480 is pressed by a spring 484 toward the position to render the clutch 346 effective. When, however, the roll 358 (Fig. 13) comes into engagement with a stop portion of the cam surface 482, this spring 484 (Fig. 12) is compressed between the slidable cam 480 and the cam 184 on the cam shaft and the clutch 346 is opened after a half rotation of the shaft. As soon as the latch 364 is depressed, however, the pendulum swings, the roll 358 is withdrawn and the clutch 346 is closed, whereupon the cam shaft will rotate another half revolution. Before this is completed the swinging of the pendulum brings cam roll 356 against the cam surface, whereupon the roll relieves the clutch 346 and stops the cam shaft.

The lubrication of the parts contained within the control box 36 effective by means of an oil pump 486 (Fig. 14) which circulates the oil through suitable pipes (not shown), delivering oil to those portions which require lubrication. The pump shaft has a pinion 488 meshing with a gear 490 on the lower clutch shaft 167.

*Coupler*

In Fig. 14 is shown the actual construction of the coupler 38 interposed between the coupling shaft 240 and the shaft 150 (Figs. 3 and 5) which is arranged to rotate the cage containing the fuse-setting jaws. The coupling shaft 240 carrying the slightly helical gear 239 is slidable axially for a short distance within a sleeve carried in the rear wall of the control box 36 and against a spring, the force of which is received by a thrust bearing. At its outer, and hence its rear, end, the coupling shaft 240 has external teeth having tapered ends. At the end of the counter recoil of the gun, these teeth are adapted to be received between the teeth formed on the inside of a cup 492 splined to the shaft 150 and spring-pressed forwardly by a surrounding spring.

In case the two sets of teeth do not mesh freely but meet end to end, then the spring will allow a slight endwise movement of the shaft 240, and its gear 239, having slightly helical teeth, will slide on the teeth of the meshing gear and impart a fraction of a turn to the shaft 240. This will disturb the end-to-end engagement of the teeth and force the shaft 240 to slip into mesh with the cup 492.

*Sequence of operations*

Assuming that the gun is in battery position with the breechblock lowered, the fuse-setter jaws closed and the feed-roll bracket swung in so that the rolls are ready to engage a shell, the latter is presented to the gun, being entered between the feed rolls under the guidance of the supporting roll 64 at the rear end, whereupon it will be seized by the rear and then the forward set of feed rolls which are rotating at a low speed, of the order of 200 R. P. M., and pushed against the fuse-setting jaws, thereby stalling the forward rolls. The cartridge case will also be presented immediately after the shell and the rear feed rolls stall as a plug of the case strikes and is stopped by contact with the shell, slipping the clutch 178 and causing the differential 190 to operate. This serves to turn the overriding clutch 205 clockwise as viewed in Fig. 9, thereby to turn the zero-stop-carrying shaft 236 (Figs. 9 and 17). This partial rotation of shaft 236 acts through rack 300 and bell crank 302 to release pin 306 from the notch 304 (Fig. 14), thus allowing the shipper 308 to be actuated by spring 322 to thrust the data pin 292 forward. Substantially simultaneously the zero-stop lug 234 is disengaged from the shoulder 232 on the fuse-clutch-release plate, or controller, 222. The wrap-around-spring clutch 224 then is able to turn the controller 222 counterclockwise until the shoulder 232 contacts the data pin 292. In this turning movement of the controller 222 the shaft 220 will be fractionally rotated also and, through the coupling 38 and the shaft 150, will set the fuse. When the shoulder 232 bangs against this data pin 292, it turns the input-data worm gear 290 slightly, sliding the data shaft 282 sufficiently (about a half inch) to turn the vertical shaft 334 and, by the arm 344 and the connections to the pin 370, to unlatch the escapement.

At this time, the cam shaft 186 turns through a half revolution, whereupon the speed shipper 182 opens the low-speed driving clutches 178 and closes the high-speed driving clutches 180 so that the feed rolls turn at higher speed, such as 1100 R. P. M. At the same time, the action of the cam 318, which is on the cam shaft, will be to pull the data pin 292 out of engagement with the controller shoulder 232, and the eccentric 390 will partly release the fuse-setting jaws which are, however, left in yielding engagement with the shell by the latch 432 (Fig. 4) and balloting of the shell avoided. The following cartridge case 44 will fully release, i. e. spread, the jaws. As soon as the data pin 292 is pulled aside, the fuse-clutch-release plate, or controller, 222 will be free to turn until the shoulder 232 comes back to its starting position, forcibly striking the zero-stop lug 234. This will shift axially the shaft 236, the rack 330, and turn the gear 332 to return the worm 288, and hence the data pin 292, to its preset starting position. This movement is retarded by the action of the corresponding dashpot 342.

The fuse-setter jaws having been withdrawn and the feed rolls driven at high speed, the round is carried forward into the gun. In so doing, the breechblock will be closed, as described heretofore. The firing pin may then be operated and, as the shot is fired, the gun will start to recoil. This will disengage the clutches 40 and 41 which drive the feed rolls, thereby allowing them to slow down and, at the same time, the spring 86 will be effective to swing the feed rolls open.

As soon as the gun starts to recoil, the spring 429 (Fig. 14) will slide the rod 428, whereupon the movement of the block cam 424 on this rod will be effective to set the escapement pendulum 352. This will cause the cam shaft to turn through a second half revolution, operating the speed shippers to close the low-speed drive clutches 178 and, working through the eccentric 390, to project the rod 400 rearwardly from the control box. Also, cam 318 will push the link 314 rearward to allow latch 302 to return behind pin 306, thus withdrawing the data pin 292 from the path of stop 232, ready to be released when latch 302 is again withdrawn.

During counter-recoil, the breechblock will open and the empty shell will be ejected, passing between the then separated fuse-setter jaws (Fig. 8) and the feed rolls, separated as in Fig. 7. Then, at the end of counter-recoil, the fuse-setter jaws will be closed by the engagement of the rod 402 with the projecting rod 400. Similarly, rod 94 (Fig. 2) of the ramming mechanism will strike the abutment 112 (Fig. 3) on the control box 36, and the ramming rolls will be moved inwardly to operative position, turning at low speed as the parts of clutches 40 and 41 re-engage.

If, on the other hand, the control handle 450 has been moved into position for firing armor-piercing shells, the fuse-setting mechanism is by-passed, and the stalling of the second set of feed rolls is effective, through the differential, to depress the trigger pin 472, allowing the escapement pendulum to move to the high-speed position under the action of its spring 384. During the recoil of the gun, the spring-pressed rod 428 (Fig. 14) operates through the cam 424 to reset the escapement pendulum to its low-speed position. As a result of these movements of the pendulum, the cam shaft goes through two half revolutions, the first half during ramming and the second half during recoil, by reason of the movement of the spring-actuated cam rod 428. The swinging lever 316 will have no effect upon the shipper 308 because the latter will then be latched in its inoperative position and the movement of the lever will be taken up in the slot 320 of the connecting link.

Having described our invention, what we claim as new and desire to secure by Letters Patent of the United States is:

1. In combination, a breech-loading gun, a fuse-setting and a ramming device mounted in tandem on said gun, said devices being constructed and arranged to act successively upon a round of two-part ammunition, the fuse-setting device being nearest to the gun, said ramming device having similar round-engaging members positioned serially behind the fuse-setting device and spaced by a sufficient distance so that said members will engage the two parts of the round respectively.

2. In combination, a breech-loading gun using two-part ammunition, successively acting sets of rotary ramming devices positioned behind the gun and spaced axially thereof, separate drives for said ramming devices each provided with a friction clutch, removable means for temporarily interrupting the progress of the round to permit the parts thereof to be brought into contact with each other, said means being interposed between the ramming devices and the gun, and means for removing said interrupting means to allow the ramming devices to deliver the two parts of the round into the barrel of the gun.

3. In combination, a breech-loading gun using two-part ammunition, ramming mechanism secured to said gun comprising successively acting sets of feed rolls, separate friction drives for said sets of feed rolls, removable means interposed between the feed rolls and the breech of the gun arranged physically to impede and prevent the progress of the round thereby causing the drive to stall, and means actuated by the stalling of the rear rolls for removing said obstruction, after the second part of the round has been brought into engagement with the rear end of the first part of the round, whereby the round may be carried forward into the gun.

4. In a device for ramming a two-part round of ammunition into a gun, the first part of the round having varying diameters axially thereof, successively acting pairs of carriers swingably mounted one behind the other upon said gun, feed rolls on said carriers coacting with the sides of the round, spring means for holding the feed rolls against the round, connecting yokes for the adjacent carriers of each pair, and a rigid connector between said yokes having a lost-motion connection to one yoke thereby preventing the forward rolls from approaching one another too closely as a result of the varying diameter of successive portions of the first part of the round.

5. In a device for ramming a two-part round of ammunition into a gun, successively acting pairs of carriers swingably mounted upon said gun, feed rolls on said carriers coacting with the sides of the round, spring means for holding the feed rolls against the round, connecting yokes for the adjacent carriers of each pair, and a rigid connector fixedly attached to the yoke for the rear set of rolls and having a lost-motion connection with the yoke for the forward rolls.

6. In a breech-loading gun, a fuse-setting mechanism positioned outside the gun, said mechanism having a rotatable device embodying a displaceable round-engaging part movable into and out of the path of a round being presented to the gun, means to operate said fuse-setting mechanism to set the fuse and to move the round-engaging part out of the path of the round, ramming mechanism to present a round of ammunition to said fuse-setting mechanism and then to move it past the fuse-setting mechanism into the gun, driven means to operate said mechanisms in a predetermined sequence, resilient means for removing the round-engaging part from the path of the round, and a latch to interrupt the action of said resilient means to leave said round-engaging part in position to engage and assist in centering the round.

7. A fuse-setting mechanism comprising a hollow, rotatable member having an opening therethrough large enough for the passage of a projectile having a fuse to be set, said member being provided with a fuse-engaging device which is mounted thereon for substantially radial movement, a sliding member connected to said fuse-engaging device and arranged to move it radially toward and away from a round of ammunition presented thereto, means to rotate said first member to set the fuse of a round passing through it, resilient means for operating said sliding member to move the fuse-engaging device away from the round, positively acting means for moving the sliding member in the opposite direction to carry the fuse-engaging device into contact with the round, and a latch for temporarily delaying the action of the operating spring whereby said fuse-engaging device acts as a resilient guide for a round moved past it.

8. A fuse-setting mechanism comprising a hollow, rotatable member having an opening therethrough large enough for the passage of a round of ammunition, said member being provided with a plurality of spaced fuse-engaging devices mounted thereon for substantially radial movement, a spring-actuated sliding member connected to said fuse-engaging devices to move them laterally toward a round of ammunition presented thereto, means to rotate the first member to set the fuse of the round, automatically operated means for positively moving said sliding member against the action of the spring to bring the fuse-engaging devices into the path of the round, a latch for interrupting the jaw-opening movement of said sliding member, and means actuated by the displacement of the jaw-opening members as a round is forced between them to pass it into the gun, said means being constructed and arranged to release said latch and permit the complete opening of the fuse-engaging devices.

9. A fuse-setting mechanism comprising a rotatable member having a cylindrical passage extending therethrough large enough to permit the passage of a round of ammunition, at least three evenly spaced fuse-engaging arms pivoted on said member for movement of the engaging ends into an inwardly, forwardly sloping position, sliding means on said rotatable member connected with said arms, a rod geared to said sliding means, a spring for moving said rod to carry the arms away from the round, a latch for interrupting the movement of the rod under the action of the spring, and a member reciprocable to disengage the latch upon spreading of the arms by a round passed through the rotatable member whereby the arms serve to guide the round and to prevent balloting.

10. In a fuse-setting and ramming mechanism, feed rolls, low-speed and high-speed drives for said feed rolls, a cam shaft urged to rotate to shift the feed roll drives from low to high-speed, means including a latch-controlled escapement to control rotation of said cam shaft, a fuse-setter-rotating mechanism including an operating device for releasing said latch, a manually operated by-pass control member for rendering ineffective part of said fuse-setter rotating mechanism, and means rendered operative by said manually operated member for operating said latch to cause at least a partial rotation of the cam shaft.

11. In a fuse-setting and ramming mechanism, dual sets of feed rolls arranged to engage seriatim successive parts of two-piece rounds of ammunition, low-speed and high-speed drives for said feed rolls, a shipper for rendering effective one or the other of said drives, a cam shaft for operating said shipper to change from low to high speed, means including a clutch to rotate said shaft, means including a latch controlling said clutch and hence the rotation of said cam shaft, fuse-setting mechanism including means for triggering the fuse-setter operation and means for releasing said latch, a manually operated device, a latch-operating mechanism rendered active by the movement of said device, and stop means moved into position by said device for limiting the movement of said triggering means.

12. In a fuse-setting and ramming mechanism for two-piece ammunition comprising a projectile and a cartridge case, fuse-setter mechanism including round-engaging members adapted to be interposed in the path of a round, automatic means for removing said round-engaging members, dual sets of feed rolls for engaging the successive parts of a round of said ammunition operating to carry the projectile part against the fuse-setter, low-speed and high-speed drives for said feed rolls, a cam shaft for shifting from low- to high-speed drive, means for driving said shaft, a latch-controlled clutch interposed between said driving means and said shaft to effect fractional rotations of the shaft, dual operating devices for releasing said latch, fuse-setting mechanism including a lever for starting the operation of said mechanism and rendering one of the latch-operating devices operative at the completion of the fuse-setting movement, a movable stop to limit the movement of said lever, a broken slide interposed between said lever and the other of said latch-operating devices, and manually operated means for completing said broken slide and for interposing said stop to limit the movement of said lever when no fuse setting is to be carried out.

FRANK E. COLE.
WILLIAM V. GOODHUE.
ROLAND HEELEY.

REFERENCES CITED

The following references are of record in the file of this patent:

UNITED STATES PATENTS

| Number | Name | Date |
| --- | --- | --- |
| 1,332,763 | Schneider | Mar. 2, 1920 |
| 2,151,288 | Waninger | Mar. 21, 1939 |
| 2,385,387 | Taylor | Sept. 25, 1945 |

FOREIGN PATENTS

| Number | Country | Date |
| --- | --- | --- |
| 260,093 | Great Britain | Oct. 28, 1926 |